(12) United States Patent
Taki

(10) Patent No.: US 9,104,396 B2
(45) Date of Patent: Aug. 11, 2015

(54) ELECTRONIC APPARATUS, CHARGING CONTROL DEVICE, AND CHARGING CONTROL METHOD

(71) Applicant: Kinji Taki, Ome (JP)

(72) Inventor: Kinji Taki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 326 days.

(21) Appl. No.: 13/682,342

(22) Filed: Nov. 20, 2012

(65) Prior Publication Data

US 2013/0290764 A1 Oct. 31, 2013

(30) Foreign Application Priority Data

Apr. 27, 2012 (JP) ................. 2012-102575

(51) Int. Cl.
*G06F 1/26* (2006.01)
*H02J 7/00* (2006.01)

(52) U.S. Cl.
CPC ............... *G06F 1/266* (2013.01); *H02J 7/0054* (2013.01)

(58) Field of Classification Search
CPC ... G06F 1/266; H02J 7/0054; H02J 2007/006; H02J 2007/0062
See application file for complete search history.

(56) References Cited

U.S. PATENT DOCUMENTS

| | | | |
|---|---|---|---|
| 2003/0030412 A1* | 2/2003 | Matsuda et al. | ............... 320/127 |
| 2005/0144495 A1 | 6/2005 | Nakajima et al. | |
| 2009/0184687 A1* | 7/2009 | Schroeder et al. | ............ 320/162 |
| 2010/0064153 A1 | 3/2010 | GJ et al. | |
| 2010/0225269 A1* | 9/2010 | Liu | ............... 320/107 |
| 2012/0326656 A1* | 12/2012 | Ikeda | ............... 320/107 |

FOREIGN PATENT DOCUMENTS

| | | |
|---|---|---|
| JP | 2002-185548 | 6/2002 |
| JP | 2004-078740 | 3/2004 |
| JP | 2011-023874 | 2/2011 |
| JP | 2011-076310 | 4/2011 |
| JP | 2012-502354 | 1/2012 |
| WO | 2010030429 A1 | 3/2010 |

OTHER PUBLICATIONS

Japanese Patent Application No. 2012-102575, First Office Action, mailed Jan. 29, 2013, (with English Translation).

\* cited by examiner

*Primary Examiner* — Dennis M Butler

(74) *Attorney, Agent, or Firm* — Rutan & Tucker LLP; William W. Schaal

(57) ABSTRACT

According to one embodiment, an electronic apparatus performs a communication with a portable device detachably attached to a port of the apparatus. The apparatus supplies bus power to the portable device through the port. The apparatus includes a notification module configured to execute an operation of notifying the portable device whether the port is a first type port configured to supply a first charging current or a second type port configured to supply a second charging current higher than the first charging current. The apparatus controls, when a remaining level of a battery of the apparatus is lower than a threshold, an operation of the notification module such that the portable device recognizes the port as the first type port.

9 Claims, 4 Drawing Sheets

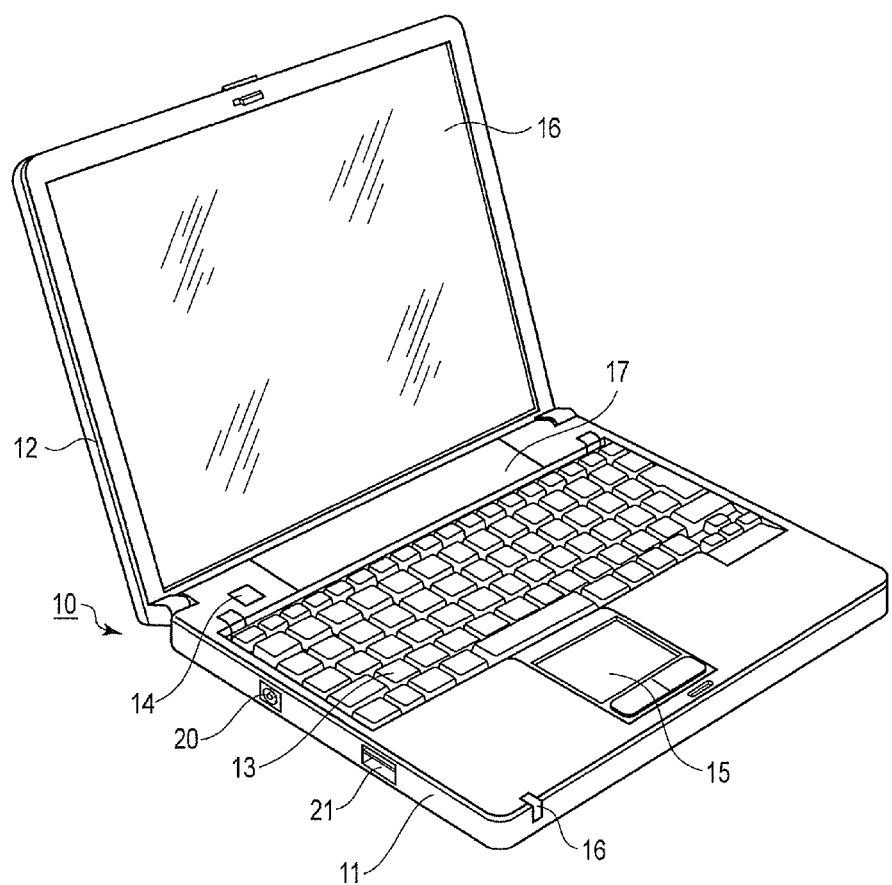
F I G. 1

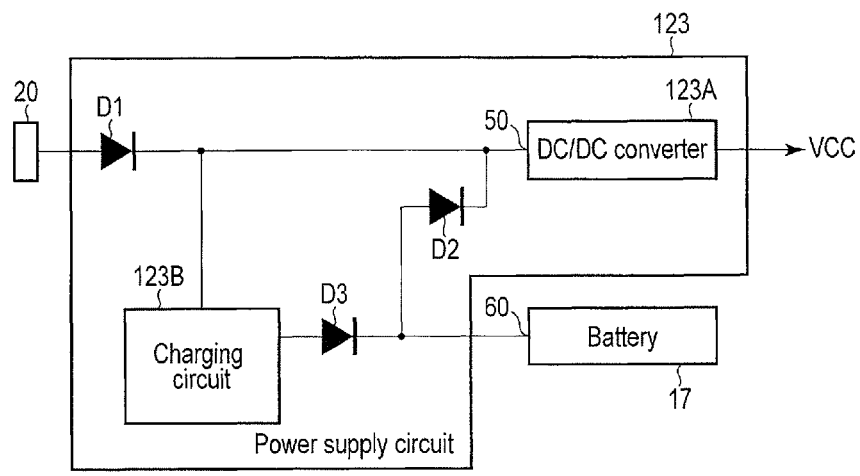
F I G. 3
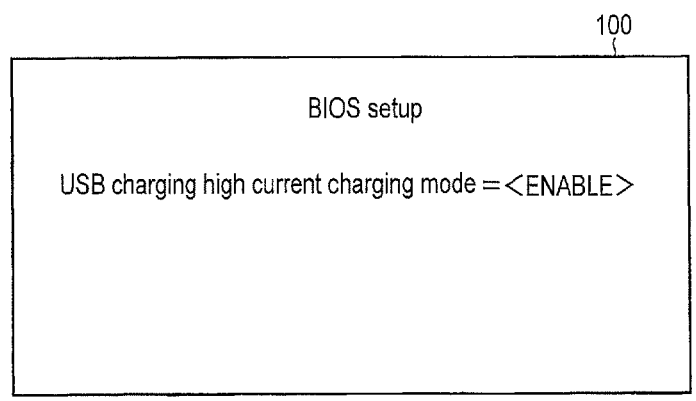
F I G. 4

ELECTRONIC APPARATUS, CHARGING CONTROL DEVICE, AND CHARGING CONTROL METHOD

CROSS-REFERENCE TO RELATED APPLICATIONS

This application is based upon and claims the benefit of priority from Japanese Patent Application No. 2012-102575, filed Apr. 27, 2012, the entire contents of which are incorporated herein by reference.

FIELD

Embodiments described herein relate generally to an electronic apparatus which can be driven by a battery, a charging control device, and a charging control method.

BACKGROUND

In recent years, various types of electronic apparatuses such as a notebook type personal computer and tablet have been developed. Most of such electronic apparatuses have a port such as a Universal Serial Bus (USB) port to which a portable device can be attached. This USB port not only allows communication between the electronic apparatus and the portable device but also can be used to charge the portable device or to supply power to it.

To charge the portable device at high speed, it is necessary to enable the portable device to draw a high current from the USB port, that is, to enable to supply a relatively high current from the USB port to the portable device.

If, however, the portable device is always allowed to draw a high current from the USB port, the electronic apparatus itself may not normally operate due to a power shortage.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view showing the outer appearance of an electronic apparatus according to an embodiment;

FIG. 3 is an exemplary view showing an arrangement of a power supply circuit provided in the electronic apparatus according to the embodiment;

FIG. 4 is an exemplary view showing a setup screen for enabling or disabling a high current charging mode, the setup screen being used by the electronic apparatus according to the embodiment;

FIG. 5 is an exemplary flowchart for explaining a procedure of a charging mode control operation executed when the electronic apparatus according to the embodiment is turned on.

DETAILED DESCRIPTION

Figure 2:
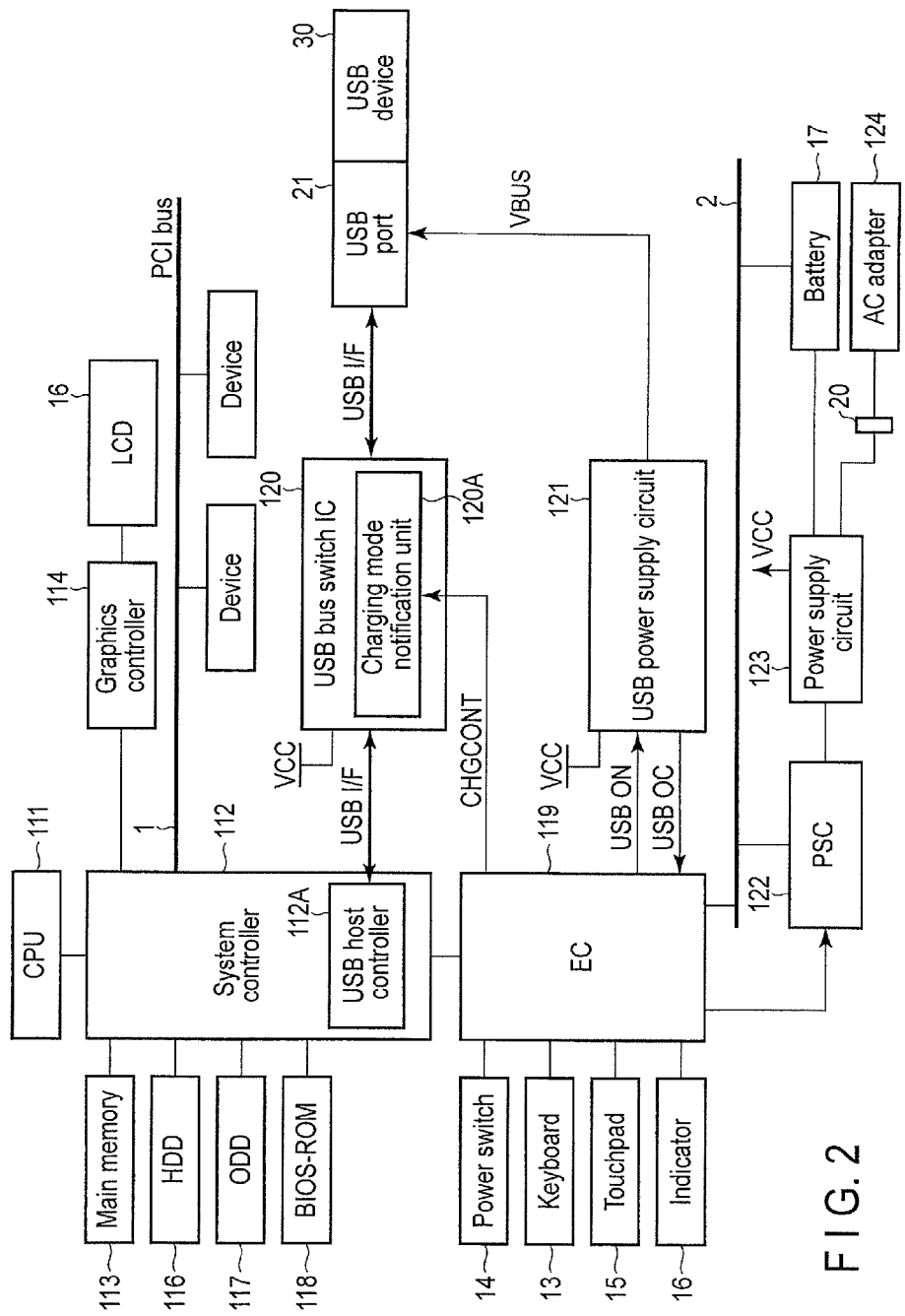
FIG. 2 is an exemplary block diagram showing a system configuration of the electronic apparatus according to the embodiment.

Various embodiments will be described hereinafter with reference to the accompanying drawings.

In general, according to one embodiment, an electronic apparatus is configured to receive power from a battery. The electronic apparatus includes a port, a host controller, a first power supply circuit, a notification module, and a control module. The host controller is configured to perform a communication with a portable device detachably attached to the port. The first power supply circuit is configured to supply bus power to the portable device through the port. The notification module is configured to execute an operation of notifying the portable device whether the port is a first type port configured to supply a first charging current or a second type port configured to supply a second charging current higher than the first charging current. The control module is configured to control, when a remaining level of the battery is lower than a threshold, an operation of the notification module such that the portable device recognizes the port as the first type port.

The configuration of an electronic apparatus according to the embodiment will first be explained with reference to FIG. 1. The electronic apparatus is configured to receive power (electric power) from a battery. The electronic apparatus can be implemented as a portable notebook personal computer, a tablet terminal, or one of other various information processing apparatuses. In the following description, assume that the electronic apparatus is implemented as a portable notebook personal computer 10.

FIG. 1 is a perspective view of the computer 10 viewed from the front side. A display unit 12 is attached to the computer 10 is in an open position. The computer 10 is configured to receive power (electric power) from a battery 17. The battery 17 may be a general lithium-ion battery with a high capacity.

The computer 10 uses power discharged by the battery 17 to supply power to components within the computer 10. The power supply output terminal of the battery 17 may be wired OR to the power supply output terminal of an external power supply unit like an AC adapter. In this case, the output voltage of the battery 17 may be set so as to be lower than the output voltage of the external power supply. This enables to preferentially use power from the external power supply unit over that from the battery 17 to supply power to the components within the computer 10.

If the battery 17 is not fully charged, a charging circuit within the computer 10 uses power from the external power supply unit to charge the battery 17.

The computer 10 includes a computer main body 11 and a display unit 12. The display unit 12 incorporates a display device formed by an LCD 16 (Liquid Crystal Display).

The display unit 12 is attached to the computer main body 11 rotatable between the open position where the upper surface of the computer main body 11 is exposed and the closed position where that upper surface is covered with the display unit 12. The computer main body 11 has a thin, box-shaped housing and includes, on its upper surface, a keyboard 13, a power switch 14 used to turn on/off the power of the computer, and a touchpad 15.

Furthermore, the computer main body 11 is provided with a power supply connector 20. The power supply connector 20 is provided on the side surface, such as the left surface, of the computer main body 11. An external power supply unit is detachably connected to the power supply connector 20. An AC adapter can be used as an external power supply unit, as described above. The AC adapter is a power supply unit for converting commercial power (AC power) into DC power.

The power supply connector 20 comprise a jack to which a power plug derived from the external power supply unit such as an AC adapter can be detachably connected. The battery 17 is detachably attached to, for example, the rear end portion of the computer main body 11. The battery 17 may be incorporated in the computer 10.

The computer 10 is driven by power from the external power supply unit or power from the battery 17. If the external power supply unit is connected to the power supply connector 20 of the computer 10, the computer 10 is driven by power from the external power supply unit. When power consumed by the computer 10 significantly increases for some reasons, the amount of power required by the computer 10 may exceed that supplied by the external power supply unit. In this case, in addition to power from the external power supply unit, power from the battery 17 is used. For example, the power consumed by the computer 10 increases when a portable device attached to the computer 10 is charged.

Furthermore, as described above, power from the external power supply unit is also used to charge the battery 17. Charging of the first battery 17 is carried out not only while the computer 10 is powered on, but also while the computer 10 is powered off. While the external power supply unit is not connected to the power supply connector 20 of the computer 10, the computer 10 is driven by power from the battery 17.

Further, the computer main body 11 is provided with an indicator 16 configured to notify various power-supply statuses such as presence/absence of the external power-supply and the like. The indicator 16 is provided at a position, for example, in front of the computer main body 11. In some embodiments the indicator 16 may be a light emitting diode (LED).

Furthermore, a port (connector) 21 such as a USB port is provided in the computer main body 11. The port 21 is used to detachably attach a portable device to the computer main body 11. The port 21 is used for communication between the computer 10 and the portable device. The port 21 can also be used to charge the portable device or supply power to the portable device. In the following description, assume that the port 21 is a Universal Serial Bus (USB) port.

In the USB port, (1) a pair of power lines (VBUS and ground (GND)), (2) a positive data line (D+), and (3) a negative data line (D−) are generally defined. VBUS is a positive power line. The computer 10 can supply, through VBUS and ground (GND), power (bus power) to the portable device attached to the USB port 21.

The positive data line (D+) and the negative data line (D−) function as a pair of differential signal lines. The computer 10 can communicate, through the positive data line (D+) and the negative data line (D−), with the portable device attached to the USB port 21.

The computer 10 has a charger function which can charge the battery of the portable device. The charger function has two charging modes, that is, a normal mode and a high current charging mode. In the normal mode, it is possible to supply, for example, a current of up to 0.5 A (a first charging current) to the portable device. In the high current charging mode, it is possible to supply, to the portable device, a current higher than that in the normal mode, for example, a current of up to 1.5 A (a second charging current). While the computer 10 is in a power-on state, the charger function can use an arbitrary one of the two charging modes, that is, the normal mode and the high current charging mode, to charge the battery of the portable device. In other words, while the computer 10 is in the power-on state, the USB port 21 can function as a first type port which can supply the first charging current or a second type port which can supply the second charging current higher than the first charging current.

The first type port may correspond to, for example, a standard downstream port (SDP) defined in Battery Charging Specification Revision 1.1. The second type port may correspond to a charging downstream port (CDP) defined in Battery Charging Specification Revision 1.1.

Using the second type port (high current charging mode) enables to charge the battery of the portable device at high speed.

In the high current charging mode, however, the portable device may draw a high current from the USB port 21 of the computer 10. If, therefore, the use of the high current charging mode is always allowed, the operation of the system of the computer 10 may become unstable or the system may be suddenly turned off due to a power shortage.

In the embodiment, the above-described charger function has a function which does not switch the charging mode to the high current charging mode, that is, a function of prohibiting the use of the high current charging mode while the computer 10 is ON. More specifically, the charger function monitors the remaining level of the battery 17. If the remaining level of the battery 17 is lower than a threshold, the charger function prohibits the use of the high current charging mode. To prohibit the use of the high current charging mode, an operation of causing the portable device to recognize the USB port 21 as the first type port can be used. This can prevent the portable device from drawing a high current from the USB port 21 to charge its battery, thereby prohibiting the use of the high current charging mode.

The operation of prohibiting the use of the high current charging mode is executed when, for example, the computer 10 is driven by power from the battery 17. The operation of prohibiting the use of the high current charging mode may be executed not only when the computer 10 is driven by power from the battery 17 but also when the computer 10 is driven by power from the external power supply unit. This is because, as described above, even when the computer 10 is driven by power from the external power supply unit, power from the battery 17 is also used to generate power to be supplied to the system if a shortage of power (operation power) to be supplied to the system of the computer 10 (various components within the computer 10 and the portable device) occurs.

As described above, in this embodiment, if the remaining level of the battery 17 is lower than the threshold, the use of the high current charging mode is prohibited. In other words, if the remaining level of the battery 17 is equal to or higher than the threshold, the use of the high current charging mode is allowed. When the remaining level of the battery 17 is equal to or higher than the threshold, no power shortage occurs even if the portable device draws a high current from the USB port. It is, therefore, possible to prevent a situation in which the operation of the system of the computer 10 suddenly becomes unstable or the system is suddenly turned off.

FIG. 2 shows the system configuration of the computer 10. The computer 10 comprises a CPU 111, a system controller 112, a main memory 113, a graphics controller 114, a hard disk drive (HDD) 116, an optical disk drive (ODD) 117, a BIOS-ROM 118, an embedded controller (EC) 119, a USB bus switch IC 120, a USB power supply circuit 121, a power supply controller (PSC) 122, and a power supply circuit 123.

The CPU 111 is a processor for controlling the operation of each component of the computer 10. The CPU 111 executes various software programs such as an operating system (OS) and various application programs, which are loaded from the HDD 116 to the main memory 113. The CPU 111 also executes a Basic Input/Output System (BIOS) stored in the BIOS-ROM 118 serving as a non-volatile memory. The BIOS is a system program for hardware control.

The system controller 112 is a bridge device which connects the CPU 111 with each component. The system controller 112 has a function of making communication with the graphics controller 114. Furthermore, the system controller 112 incorporates a memory controller for controlling the main memory 113. The graphics controller 114 is a display controller for controlling the LCD 16 used as the display monitor of the computer 10.

The system controller 112 is connected with a PCI bus 1, and makes communication with each device on the PCI bus 1. Furthermore, the system controller 112 incorporates an IDE (Integrated Drive Electronics) controller or Serial ATA controller configured to control the hard disk drive (HDD) 116 and optical disk drive (ODD) 117.

The system controller 112 also includes a USB host controller 112A. The USB host controller 112A is configured to control a USB device 30 serving as a portable device which is detachably attached to the USB port 21, and makes communication with the USB device 30. Communication between the USB host controller 112A and the USB device 30 is made via a USB interface (USB I/F). The USB interface is formed by the above-described positive data line (D+) and negative data line (D−).

In this embodiment, the USB host controller 112A is connected to the USB port 21 through the USB bus switch IC 120. The USB bus switch IC 120 includes a charging mode notification unit 120A in order to indicate the USB device 30 of the charging mode (USB charging mode) supported by the computer 10.

The charging mode notification unit 120A executes an operation of notifying, by communication with the USB device 30 via the USB port 21, the USB device 30 of whether the present USB charging mode of the computer 10 is the normal mode or the high current charging mode, that is, whether the USB port 21 is the first type port (for example, the standard downstream port (SDP)) or the second type port (for example, the charging downstream port (CDP)).

The USB device 30, for example, can execute processing (charger detection processing) for detecting the type of USB port 21 according to a protocol defined in Battery Charging Specification Revision 1.1. The charging mode notification unit 120A has a function of responding to the charger detection processing executed by the USB device 30.

The USB device 30 starts the charger detection processing to determine the type of USB port 21 of the computer 10 (host device). That is, the USB device 30 attached to the USB port 21 determines the type of USB port 21 by applying a predetermined voltage to the positive data line (D+) and checking a voltage on the negative data line (D−).

According to a charging mode setting signal (CHGCONT) from the EC 119, the charging mode notification unit 120A executes response processing for notifying that the USB port 21 is the first type port or response processing for notifying that the USB port 21 is the second type port.

The USB power supply circuit 121 serves as a first power supply circuit configured to supply bus power (VBUS) to the USB device 30 through the USB port 21. The USB power supply circuit 121 is designed to have a power supply capability which can perform high current charging like the charging downstream port (CDP). The USB power supply circuit 121 is turned on or off according to a signal USBON from the EC 119.

Furthermore, the USB power supply circuit 121 has an overcurrent detection function, which detects whether a current which is drawn by the USB device 30 through the USB port 21 exceeds an upper limit value. Upon detecting that a current drawn by the USB device 30 has exceeded the upper limit value, the USB power supply circuit 121 generates a USB overcurrent detection signal USBOC to notify the EC 119 that an overcurrent has been detected. In this case, the EC 119 may turn off the USB power supply circuit 121.

The EC 119, power supply controller (PSC) 122, and battery 17 are interconnected via a serial bus 2 like an $I^2C$ bus. The embedded controller (EC) 119 is a power supply management controller for power management of the computer 10, and is implemented by, for example, a one-chip microcomputer which incorporates a keyboard controller for controlling the keyboard (KB) 13, the touchpad 15, and the like. The EC 119 has a function of powering on and off the computer 10 in response to the user operation of the power switch 14. The EC 119 and power supply controller (PSC) 122 cooperate with each other to control to power on/off the computer 10. Upon receiving an ON signal transmitted by the EC 119, the power supply controller (PSC) 122 controls the power supply circuit 123 to power on the computer 10. Upon receiving an OFF signal transmitted by the EC 119, the power supply controller (PSC) 122 controls the power supply circuit 123 to power off the computer 10. Even while the computer 10 is OFF, the EC 119, power supply controller (PSC) 122, and power supply circuit 123 operate by power from the battery 17 or an AC adapter 124.

Furthermore, the EC 119 monitors the remaining level of the battery 17. If the remaining level of the battery 17 is lower than the threshold, the operation of the USB bus switch IC 120 (charging mode notification unit 120A) is controlled by the EC 119 so that the USB device 30 recognizes the USB port 21 as the first type port. The EC 119, for example, can receive battery information indicating the remaining level of the battery 17 from the power supply controller (PSC) 122. The EC 119 may directly receive the battery information indicating the remaining level of the battery 17 from the battery 17, as a matter of course. The EC 119 also controls the USB power supply circuit 121.

The embedded controller (EC) 119, USB, bus switch IC 120, and USB power supply circuit 121 function as a charging control device configured to control charging of the USB device 30 attached to the USB port 21.

The charging control device can charge the USB device 30 even while the computer 10 is OFF. In this case, the USB device 30 may be charged using, for example, the above-described normal mode.

The power supply circuit 123 generates power (operation power) to be supplied to each component using power from the battery 17 or power from the AC adapter 124 which is connected to the computer main body 11 as an external power supply. If the AC adapter 124 is connected to the computer main body 11, the power supply circuit 123 charges the battery 17 while generating operation power to each component using power from the AC adapter 124.

FIG. 3 shows an example of the arrangement of the power supply circuit 123. The power supply circuit 123 comprises a DC/DC converter 123A and a charging circuit 123B. The power supply connector 20 connected with the AC adapter 124 is connected to an input terminal 50 of the DC/DC converter 123A through a diode D1. An output terminal 60 of the battery 17 is connected to the input terminal 50 of the DC/DC converter 123A through a diode D2. The charging circuit 123B is connected to the output terminal 60 of the battery 17 through a diode D3.

A power supply voltage output from the AC adapter 124 is set to be higher than that output from the battery 17. If, therefore, the AC adapter 124 is connected to the power supply connector 20, the battery 17 is not discharged. If, however, power consumed by the system excessively increases, the power supply voltage output from the AC adapter 124 may drop. In this case, discharge of the battery 17 automatically starts, and the DC/DC converter 123A generates operation power using power from the battery 17 in addition to power from the AC adapter 124.

FIG. 4 shows a BIOS setup screen 100 presented by the BIOS program to the user. The BIOS setup screen 100 displays various setting items for prompting the user to set the operational environment of the computer 10. The various setting items include a setting item associated with USB charging. The setting item associated with USB charging is used to enable or disable the high current charging mode. The user can specify enabling or disabling of the high current charging mode by operating an input device like the keyboard 13.

If the user specifies disabling of the high current charging mode, the USB charging mode of the computer 10 is set to the normal mode irrespective of the remaining level of the battery 17. On the other hand, if the user specifies enabling of the high current charging mode, the USB charging mode of the computer 10 is set to the normal mode or high current charging mode depending on the remaining level of the battery 17. USB charging mode information indicating enabling/disabling of the high current charging mode is stored in the non-volatile memory of the computer 10. The non-volatile memory may be the BIOS-ROM 118, or a battery backup memory like a so-called "CMOS".

A USB charging mode control operation procedure which is executed by the EC 119 when the computer 10 is turned on will be described next with reference to a flowchart shown in FIG. 5. When the computer 10 is turned on, the EC 119 refers to the USB charging mode information to determine whether the high current charging mode is enabled or disabled (step S11).

If the high current charging mode is disabled, the EC 119 uses the charging mode setting signal (CHGCONT) to set the USB bus switch IC 120 to the normal mode (step S12). In the normal mode, when the USB device 30 starts the charger detection processing, the USB bus switch IC 120 operates so that the USB device 30 recognizes the USB port 21 as the first type port.

On the other hand, if the high current charging mode is enabled, the EC 119 first turns off the USB power supply circuit 121 (step S13). In step S13, by turning off the USB power supply circuit 121, supply of VBUS to the USB port 21 stops. Then, the EC 119 checks the remaining level of the battery 17 (step S14).

If the remaining level of the battery 17 is equal to or higher than the threshold (for example, 10% of full capacity), the EC 119 uses the charging mode setting signal (CHGCONT) to set the USB bus switch IC 120 to the high current charging mode (step S15). In the high current charging mode, when the USB device 30 starts the charger detection processing, the USB bus switch IC 120 operates so that the USB device 30 recognizes the USB port 21 as the second type port. Then, the EC 119 turns on the USB power supply circuit 121 (step S16). In step S16, the USB power supply circuit 121 is turned on to supply VBUS to the USB port 21. This enables to cause the USB device 30 to start the charger detection processing for detecting the type of USB port 21 even if the USB device 30 is attached to the USB port 21 before the computer 10 is turned on, thereby causing the USB device 30 to recognize the USB port 21 as the second type port.

Figure 5:
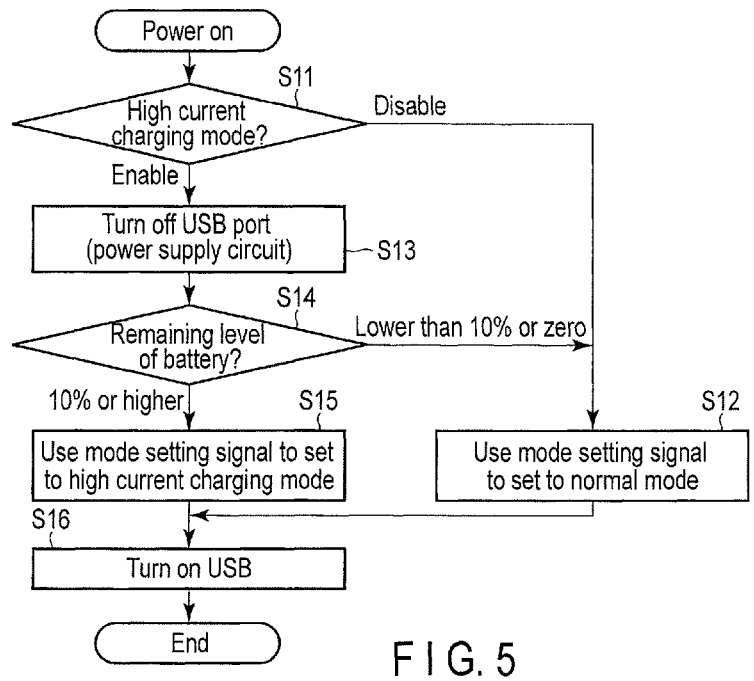

Note that the processing in steps S11 to S16 of FIG. 5 can be executed irrespective of whether the USB device 30 has been attached to the USB port 21. When the USB device 30 is attached to the USB port 21, it detects VBUS, which triggers the charger detection processing.

Figure 6:
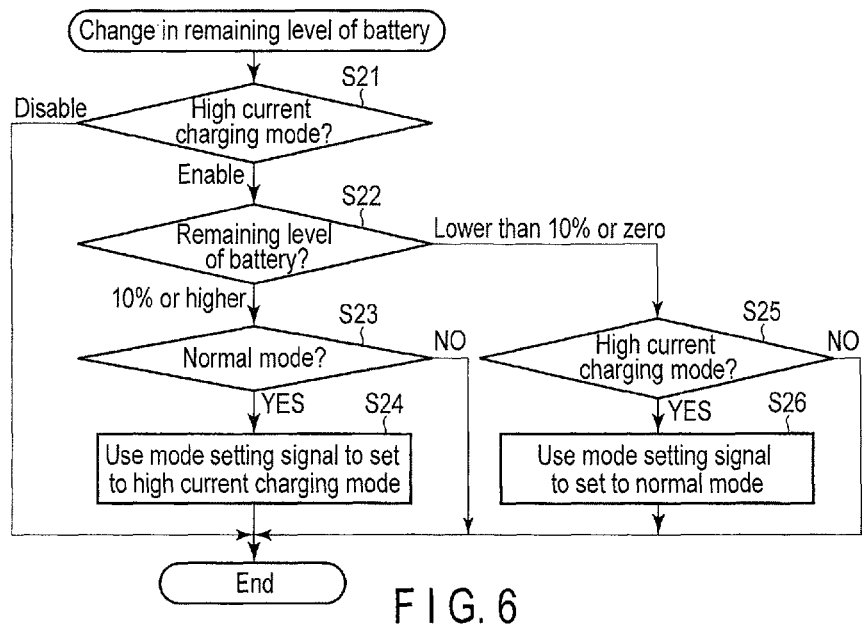
FIG. 6 is an exemplary flowchart for explaining a procedure of a charging mode control operation executed while the electronic apparatus according to the embodiment is in a power-on state.

A charging mode control operation procedure which is executed by the EC 119 while the computer 10 is in a power-on state will be described next with reference to a flowchart shown in FIG. 6.

The EC 119 refers to the USB charging mode information to determine whether the high current charging mode is enabled or disabled (step S21). If the high current charging mode is enabled, the EC 119 monitors the remaining level of the battery 17 to check whether it changes, while the computer 10 is in the power-on state (step S22).

If the remaining level of the battery 17 increases to the threshold (for example, 10% of full capacity) or higher, the EC 119 determines whether the present USB charging mode is the normal mode, that is, whether the USB bus switch IC 120 has been set to the normal mode (step S23). If the present USB charging mode is the normal mode, in order to switch the present USB charging mode to the high current charging mode, the EC 119 uses the charging mode setting signal (CHGCONT) to set the USB bus switch IC 120 to the high current charging mode (step S24). In the high current charging mode, when the USB device 30 starts the charger detection processing, the USB bus switch IC 120 operates so that the USB device 30 recognizes the USB port 21 as the second type port.

If the remaining level of the battery 17 decreases to be lower than the threshold (for example, 10% of full capacity), the EC 119 determines whether the present USB charging mode is the high current charging mode, that is, whether the USB bus switch IC 120 has been set to the high current charging mode (step S25). If the present USB charging mode is the high current charging mode, in order to switch the present USB charging mode to the normal mode, the EC 119 uses the charging mode setting signal (CHGCONT) to set the USB bus switch IC 120 to the normal mode (step S26). In the normal mode, when the USB device 30 starts the charger detection processing, the USB bus switch IC 120 operates so that the USB device 30 recognizes the USB port 21 as the first type port.

With the above processing, when the USB device 30 is attached to the USB port 21 in a state in which the remaining level of the battery 17 has decreased below the threshold (for example, 10% of full capacity), it is possible to cause the USB device 30 to recognize the USB port 21 as the first type port, thereby prohibiting the USB device 30 from drawing a high current from the USB port 21.

As described above, according to this embodiment, if the remaining level of the battery 17 is lower than the threshold, the operation of the USB bus switch IC 120 (charging mode notification unit 120A) is controlled so that the portable device (USB device) recognizes the USB port 21 as the first type port. If, therefore, the remaining level of the battery 17 is lower than the threshold, it is possible to prevent the USB device from drawing a high current to charge itself, thereby preventing a situation in which the operation of the computer 10 suddenly becomes unstable or the computer 10 is suddenly turned off. It is thus possible to charge the portable device like the USB device without a malfunction of the computer 10.

Note that a case in which the two charging modes including the normal mode and high current charging mode are selectively used has been described in this embodiment. However, three or more charging modes for which maximum usable charging current values are different from each other may be selectively used.

Furthermore, the embodiment is also applicable to a port, such as an IEEE 1394 port or display port, other than the USB port. A current value which can be supplied to a device connected to a port such as an IEEE1394 port or display port may be adaptively controlled according to the remaining level of the battery 17.

It is also possible to execute, using computer programs, the procedures described with reference to the flowcharts of FIGS. 5 and 6. In this case, it is possible to readily obtain the same effects as in the embodiment only by installing, through a computer-readable storage medium storing the computer programs, the computer programs on a computer having a port like a USB port.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus configured to receive power from a battery, comprising:
   a port;
   a host controller configured to perform a communication with a portable device detachably attached to the port;
   a first power supply circuit configured to supply bus power to the portable device through the port;
   a notification circuit configured to execute an operation of notifying the portable device whether the port is a first type configured to supply a first charging current or a second type port configured to supply a second charging current higher than the first charging current;
   a processor configured to execute a process for enabling or disabling a first charging mode based on a user input, the first charging mode enabling charging of the portable device by using the second charging current; and
   a controller configured to:
      control the notification circuit to notify the portable device that the port is of the first type, when the first charging mode is disabled;
      control the notification circuit to notify the portable device that the port is of the first type, when the first charging mode is enabled and a remaining level of the battery is lower than a threshold; and
      control the notification circuit to notify the portable device that the port is of the second type, when the first charging mode is enabled and the remaining level of the battery is not lower than the threshold.

2. The apparatus of claim 1, wherein the controller is configured to determine, when the apparatus is turned on, whether the remaining level of the battery is lower than the threshold.

3. The apparatus of claim 1, wherein the port is a Universal Serial Bus port.

4. The apparatus of claim 1, wherein the notification circuit is configured execute an operation of notifying the portable device whether the port is of the first type or of the second type, in response to a request for detecting a type of the port from the portable device.

5. A charging control device in an electronic apparatus, the electronic apparatus being configured to receive power from a battery, the charging control device comprising:
   a notification circuit configured to execute an operation of notifying a portable device detachably attached to a port of the electronic apparatus whether the port is of a first type configured to supply a first charging current or of a second type configured to supply a second charging current higher than the first charging current;
   a processor configured to execute a process for enabling or disabling a first charging mode based on a user input, the first charging mode enabling charging of the portable device by using the second charging current; and
   a controller configured to:
      control the notification circuit to notify the portable device that the port is of the first type, when the first charging mode is disabled;
      control the notification circuit to notify the portable device that the port is of the first type, when the first charging mode is enabled and a remaining level of the battery is lower than a threshold; and
      control the notification circuit to notify the portable device that the port is of the second type, when the first charging mode is enabled and the remaining level of the battery is not lower than the threshold.

6. The device of claim 5, wherein the controller is configured to determine, when the electronic apparatus is turned on, whether the remaining level of the battery is lower than the threshold.

7. The device of claim 5, wherein the notification circuit is configured execute an operation of notifying the portable device whether the port is of the first type or of the second type, in response to a request for detecting a type of the port from the portable device.

8. A charging control method of controlling charging of a portable device detachably attached to a port which is provided in an electronic apparatus configured to receive power from a battery, comprising:
   executing a process for enabling or disabling a first charging mode based on a user input, the first charging mode enabling charging of the portable device by using a first charging current;
   determining whether a remaining level of the battery is lower than a threshold;
   notifying the portable device that the port is of a first type configured to supply a second charging current lower than the first charging current, when the first charging mode is disabled;
   notifying the portable device that the port is of the first type, when the first charging mode is enabled and the remaining level of the battery is lower than the threshold; and
   notifying the portable device that the port is of a second type configured to supply the first charging current, when the first charging mode is enabled and the remaining level of the battery is not lower than the threshold.

9. The method of claim 8, wherein the determining comprises determining, when the electronic apparatus is turned on, whether the remaining level of the battery is lower than the threshold.

* * * * *